No. 833,188. PATENTED OCT. 16, 1906.
W. L. WARD.
MANUFACTURE OF NUTS.
APPLICATION FILED MAY 16, 1905.

2 SHEETS—SHEET 1.

Witnesses:
Louis H. Buck
Inventor:—
Wm. L. Ward
by Chas. N. Butler
Attorney.

No. 833,188. PATENTED OCT. 16, 1906.
W. L. WARD.
MANUFACTURE OF NUTS.
APPLICATION FILED MAY 16, 1905.

2 SHEETS—SHEET 2.

Witnesses:—
Louis F. Buck.
Willy E. Crane Jr.

Inventor:—
Wm. L. Ward
by
Chas. N. Butler
Attorney.

UNITED STATES PATENT OFFICE.

WILLIAM L. WARD, OF PORT CHESTER, NEW YORK.

MANUFACTURE OF NUTS.

No. 833,188.  Specification of Letters Patent.  Patented Oct. 16, 1906.

Application filed May 16, 1905. Serial No. 260,633.

*To all whom it may concern:*

Be it known that I, WILLIAM L. WARD, a citizen of the United States, residing at Port Chester, in the county of Westchester and State of New York, have invented certain Improvements in the Manufacture of Nuts, of which the following is a specification.

This invention relates to a method of manufacturing nuts whereby metal bars are transformed into the finished product by sequential operations that can be performed rapidly and without material waste, effecting economy in time and material.

The bars of metal to be manufactured into nuts are rolled or pressed into shapes, having the metal distributed so that they can be separated, shaped, drilled, and trimmed to final form with the utilization of practically all of the metal of the bar, as distinguished from a former scrap waste amounting commonly to thirty per cent. of the material.

The nature and characteristic features of the invention will appear from the following description and the accompanying drawings in illustration thereof, of which—

Figure 1:
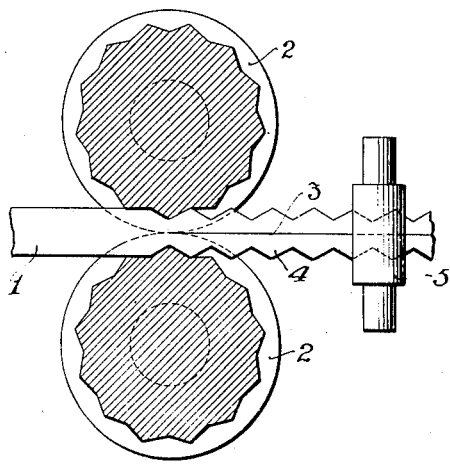
Figure 2:
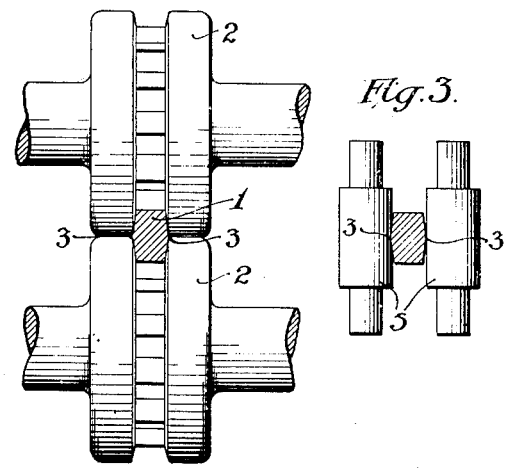
Figure 3:
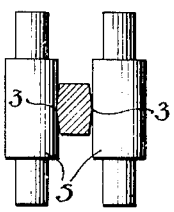
Figure 4:
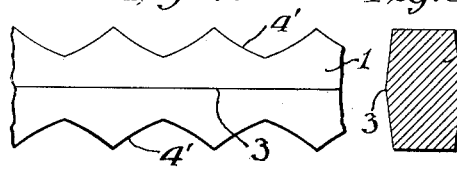
Figure 5:
Figure 6:
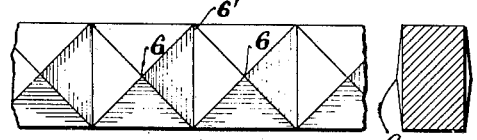
Figure 7:
Figure 8A:
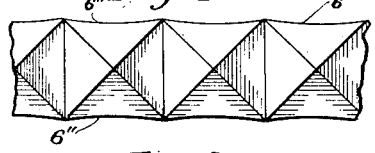
Figure 8:
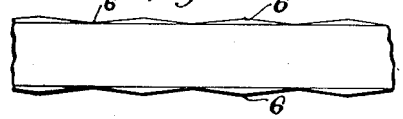
Figure 9:
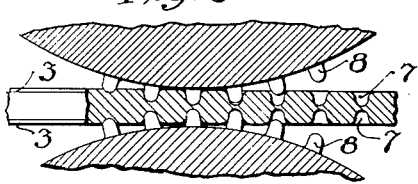
Figure 10:
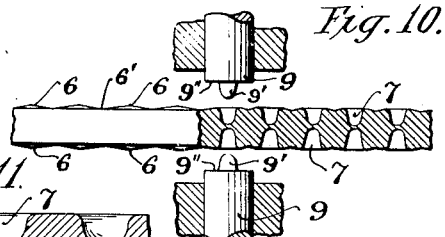
Figure 11:
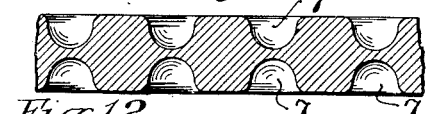
Figure 12:
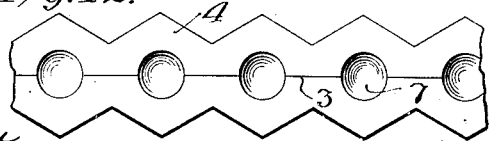
Figure 13:
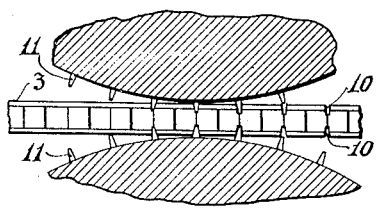
Figure 14:
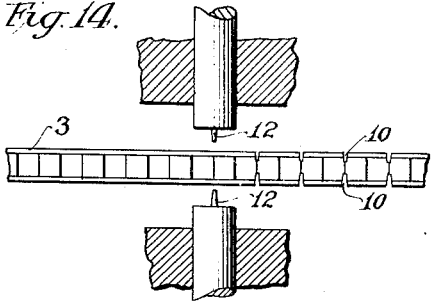
Figure 15:
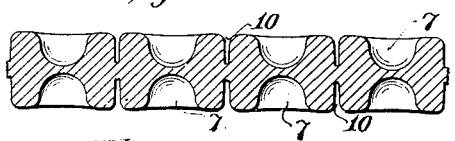
Figure 16:
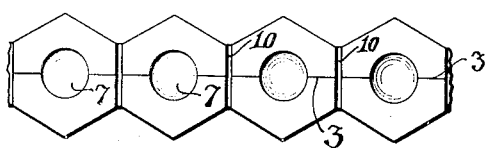
Figure 17:
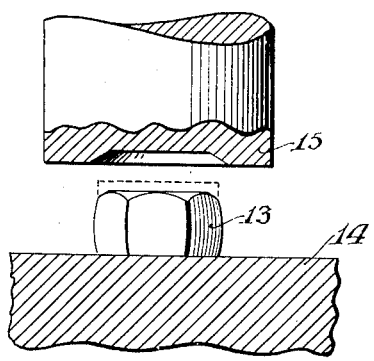
Figure 18:
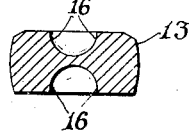
Figure 19:
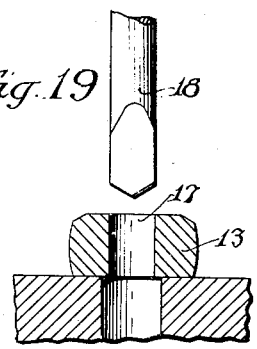
Figure 20:
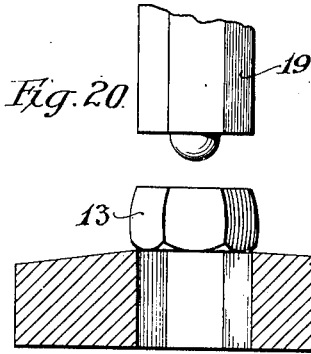
Figure 21:
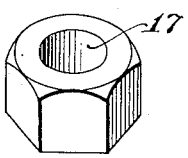

Figure 1 is a sectional side view representing the rolling of a bar with crowned or arched faces and serrated edges suitable for making hexagonal nuts. Fig. 2 is a sectional end view of the bar and the rolls for crowning and serrating it. Fig. 3 is a sectional end view of the crowned bar and the rolls for flattening the ridges or removing the fins formed by the rolling pass producing the crown. Fig. 4 is a plan view, and Fig. 5 is a sectional view, of a serrated bar whose crowns have the form of a longitudinal ridge, the edges of the serrations being concaved. Fig. 6 is a plan view, Fig. 7 is a sectional view, and Fig. 8 is a side view, of a bar having crowns of pyramidal form, the edges having the plain form used in making square nuts. Fig. 8ª is a plan view of a modified form of the strip of blanks shown in Figs. 6 to 8. Fig. 9 is a sectional side view representing the sinking of a crowned bar by rolling-dies. Fig. 10 is a sectional side view representing the sinking of a crowned bar by reciprocating dies. Fig. 11 is a longitudinal sectional view, and Fig. 12 is a plan view, of a bar having the sinks formed in the crowned faces thereof. Fig. 13 is a sectional side elevation representing the nicking of the crowned faces of a bar by rolling-dies. Fig. 14 is a sectional side elevation representing the nicking of the crowned faces of a bar by reciprocating dies. Fig. 15 is a longitudinal sectional view, and Fig. 16 is a plan view, representing a bar having nicks and sinks formed therein. Fig. 17 is a side view representing an elevation of a nut-blank and a section of the dies for facing it. Fig. 18 is a sectional view of a sunken and faced nut-blank. Fig. 19 is a sectional side view illustrating the drilling of the blank shown in Fig. 18. Fig. 20 is a sectional side view illustrating the operation of trimming a nut, and Fig. 21 is a perspective view of the finished blank.

In practicing the invention, as illustrated in Figs. 1 to 3, inclusive, a bar of steel 1 is passed through rolls 2, which form it with the ridge-like crowns or arches 3 upon the faces and serrations or zigzags 4 upon the edges thereof, the bar being submitted to a second pass through rolls 5 to flatten the ribs or remove the fins that may be formed in crowning.

The serrated and crowned bar, as shown in Figs. 4 and 5, may have the faces 4' of the serrated edges concaved to compensate for expansion by the sinking to be effected. The bar may also be brought to a form, by rolling or otherwise, having the symmetrical pyramidal crowns or arches 6 on the faces with the depressions 6' between them, and straight edges, as illustrated in Figs. 6, 7, and 8, or with the concavities 6" in the edges, as shown in Fig. 8ª, the edges being preferably given such form in any case as will expand to or approximately to the form required for the character of nut desired, whether square, hexagonal, or octagonal. The crowned bar may now be provided with the uniformly-spaced sinks or indentations 7, centrally and symmetrically disposed, so that the several indentations in each face are approached by others in line therewith in the opposite face, being formed by rolling-dies 8, as shown in Fig. 9, or by reciprocating dies 9, as shown in Fig. 10, a type of the product being shown in Figs. 11 and 12. It is advantageous, however, to subject the bar to an operation producing depressions or nicks 10 in opposite faces thereof in the respective planes or their final separation, the operation being effected either by passing the crowned bar through the rolling-dies 11 or the reciprocating dies 12, forming such depressions or nicks at uniform intervals midway between the centers of the sinks in the planes of finally separating the blanks, and thus disposing the metal so that it will flow to effect the redistribution desired in facing the blanks by pressure, the partial separation providing an advantage not only in the distribution of the metal, but also in the final separation of the strip of blanks. This nicking operation may be performed either before or after sinking.

In sinking the blanks the metal is drawn down around the edges of the sinks so that the tops thereof flare like the base of a bell. To correct this condition and to bring the faces of the separate blanks to the correct contour of the blank 13, the metal is redistributed by subjecting them to pressure by the facing-dies 14 and 15. The strip of blanks having been separated and respectively faced, the configurations shown in Fig. 15 are brought to that shown in Fig. 18, in which the entrance to the sinks 16 is substantially the bore to be formed for taking the thread.

In sinking the crowned blanks the drift of the metal resulting in a flaring hole, as caused by the punches 9' of the dies 9, may be wholly or partly corrected by so constructing the dies that the faces 9" thereof will press the crowns and force the metal thereof against the punches in close sequence with the sinking operation.

The faced blanks are then given the bore 17 by the drill 18 and then forced by the male die 19 through the female die 20 to trim them to the final form. (Shown in Fig. 21.)

It is to be understood that the order of operations described may be varied or they may be performed simultaneously, and certain of the operations may be omitted without destroying the beneficial results of others, and consequently the right is reserved, so far as may be, to so vary the mode of operation.

Having described my invention, I claim—

1. The method of manufacturing nuts which consists in crowning by pressure, sinking and pressing the opposite faces of the metal forming the nut-blanks, substantially as specified.

2. The method of manufacturing nuts which consists in forging crowns, depressions and sinks in the faces of a bar of metal, the depressions and sinks alternating at uniformly-spaced points, redistributing the metal by pressing the resulting blanks and forming the bores of said blanks, substantially as specified.

3. The method of manufacturing nuts which consists in forming serrations with concave faces in the edges of a bar and sinking the faces of said bar, substantially as specified.

4. The method of manufacturing nuts which consists in concaving the edges of a bar of metal and sinking and pressing the faces of said bar, substantially as specified.

In testimony whereof I have hereunto set my hand, this 12th day of May, 1905, in the presence of the subscribing witnesses.

WILLIAM L. WARD.

In presence of—
  R. J. SNYDER,
  JOSEPH HAIGHT.